(12) United States Patent
Joho

(10) Patent No.: US 7,560,834 B2
(45) Date of Patent: Jul. 14, 2009

(54) GENERATOR SWITCH

(75) Inventor: Reinhard Joho, Rombach (CH)

(73) Assignee: ALSTOM Technology Ltd., Baden (CH)

(*) Notice: Subject to any disclaimer, the term of this patent is extended or adjusted under 35 U.S.C. 154(b) by 0 days.

(21) Appl. No.: 11/278,201

(22) Filed: Mar. 31, 2006

(65) Prior Publication Data

US 2006/0220471 A1 Oct. 5, 2006

(30) Foreign Application Priority Data

Mar. 31, 2005 (CH) .................................. 0583/05

(51) Int. Cl.
*H02B 1/24* (2006.01)

(52) U.S. Cl. .................. 307/127; 307/115; 307/116; 307/139

(58) Field of Classification Search ............. 307/127, 307/115–116, 139
See application file for complete search history.

(56) References Cited

U.S. PATENT DOCUMENTS

| 4,492,878 | A | | 1/1985 | Hamel | |
|---|---|---|---|---|---|
| 4,779,051 | A | * | 10/1988 | Grunewald et al. | 324/536 |
| 6,496,343 | B2 | * | 12/2002 | Mahlein et al. | 361/91.1 |
| 7,084,524 | B2 | * | 8/2006 | Lacaze et al. | 307/3 |
| 7,180,270 | B2 | * | 2/2007 | Rufer et al. | 322/20 |

FOREIGN PATENT DOCUMENTS

| DE | 10310307 | | 10/2003 |
|---|---|---|---|
| EP | 0984552 | | 3/2000 |
| JP | 2004215405 | | 7/2004 |
| WO | WO2004/045058 | * | 5/2004 |
| WO | WO2005/004317 | * | 1/2005 |

OTHER PUBLICATIONS

Backlund, B., et al., "Bi-Directional Control Thyristor," ABB Semiconductors AG, 1999, pp. 1-16, Doc. No. 5SYA Feb. 2006, Lenzburg, Switzerland.

Zehnder, L., et al., "SF6 generator circuit-breaker system for short-circuit currents up to 200 kA," ABB Review 2002, pp. 34-40, ABB, Baden, Switzerland.

Search Report for Swiss Patent App. No. CH 5832005 (Nov. 22, 2005).

* cited by examiner

*Primary Examiner*—Albert W Paladini
*Assistant Examiner*—Carlos Amaya
(74) *Attorney, Agent, or Firm*—Cermak Kenealy Vaidya & Nakajima LLP; Adam J. Cermak

(57) ABSTRACT

In a device for disconnecting and/or connecting m phases (u, v, and w) of an alternating voltage providing source (1) from n phases (n1, n2, n3) of a load (3), each of the m phases (u, v, w) of the source (1) independently is connected by a power switch (9) with each of the n phases in a m×n matrix. First measuring devices (4) for monitoring the m phases (u, v, w) of the source (1) as well as 2nd measuring devices (5) for monitoring the n phases (n1, n2, n3) of the load (3) are provided, and a switching unit (6) is provided, which controls the switching state of the switches (9) depending on the state of the m phases (u, v, w) of the source (1) and of the n phases (n1, n2, n3) of the load (3). This construction allows a particularly quick connection and/or disconnection for increased stability.

24 Claims, 8 Drawing Sheets

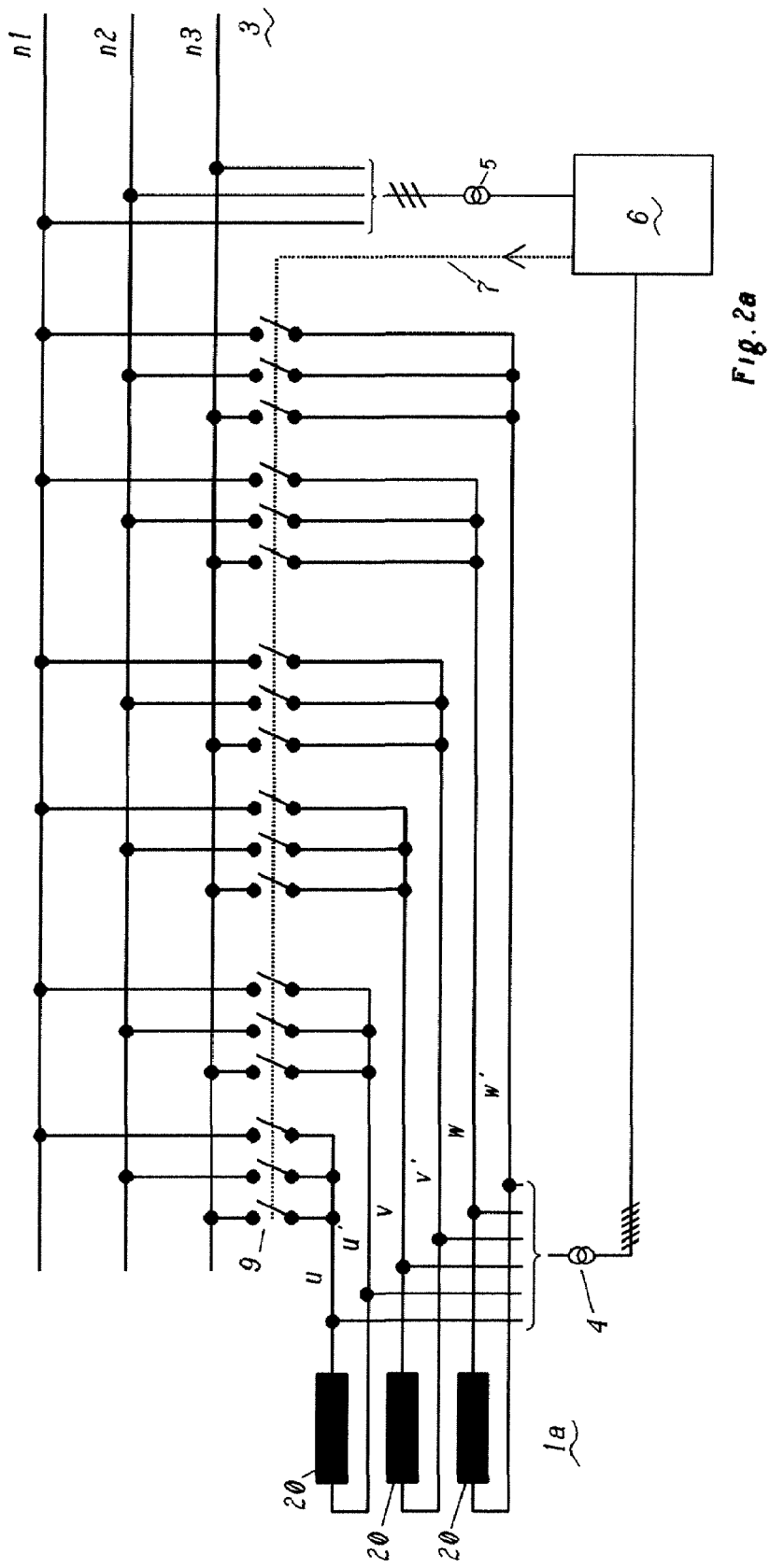

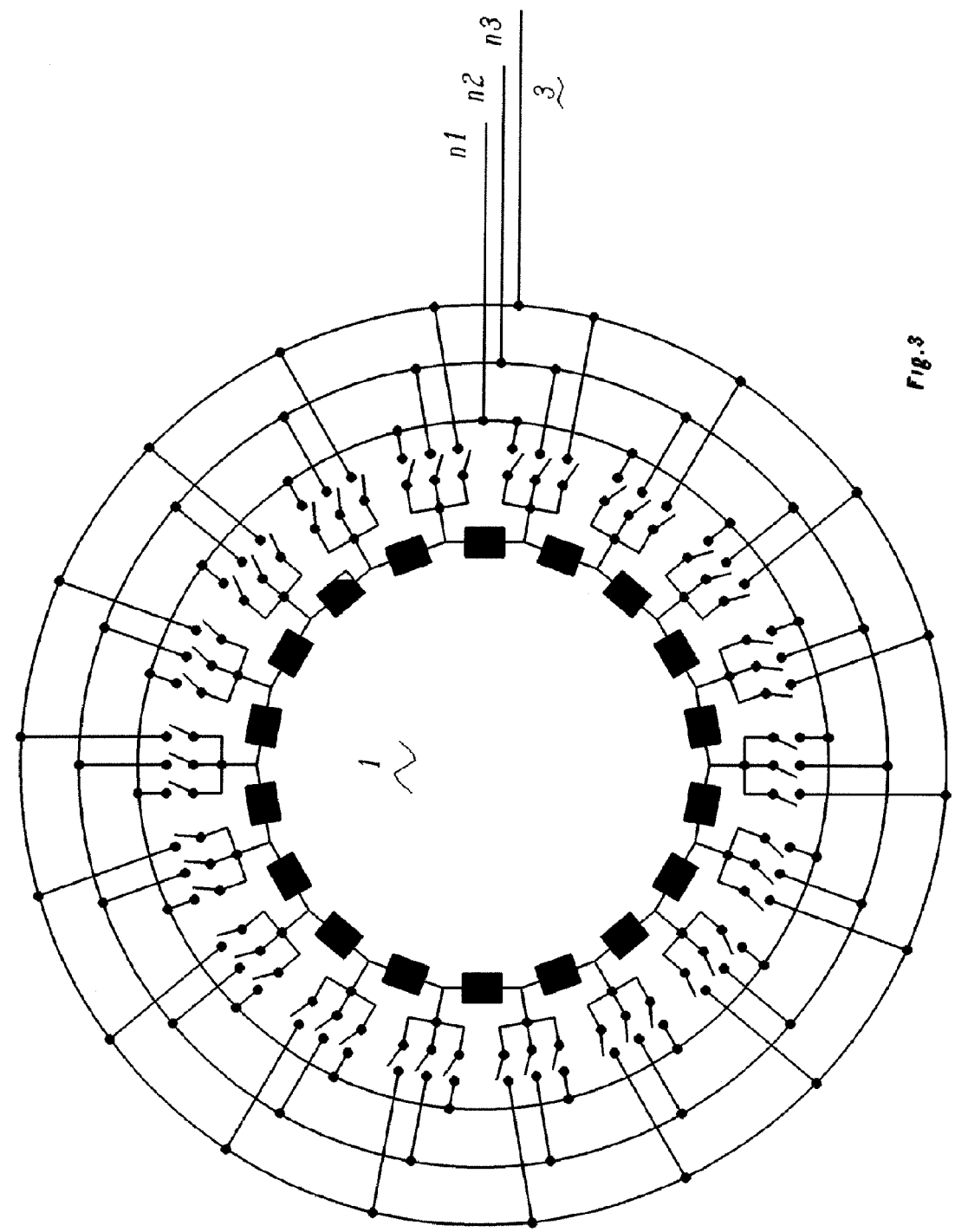

GENERATOR SWITCH

This application claims priority under 35 U.S.C. § 119 to Swiss application number 00583/05, filed 31 Mar. 2005, the entirety of which is incorporated by reference herein.

BACKGROUND OF THE INVENTION

1. Field of the Invention

The present invention relates to the field of power switch devices for rotating generators, preferably synchronous generators, with which high performance generators in a range of several 1 MW to 2000 MW can be connected to and/or disconnected from the grid within very short periods of time. Furthermore the present invention relates to methods for operating such devices. Generators and grids are polyphase alternating current systems. The grid is comprised of power consumers, power generators and connecting lines.

2. Brief Description of the Related Art

Typically a generator that is operated to generate electric energy is connected to a grid by means of a generator switch (between generator and transformer), a transformer, and a grid switch (between transformer and grid). It is known to turn on a generator switch when the three synchronization conditions of voltage phase sequence and voltage phase position, voltage amplitude, and slip are met. The connection is obtained by simultaneously closing the switches of each phase of the connection between generator and grid. For a customary three-phase system this means that each of the three phase binding posts of the generator is connected to the corresponding phase binding posts of the grid. It is irrelevant whether this occurs with one switch on generator voltage level (between generator and transformer, i.e., by means of the generator switch) or on high voltage level (between transformer and grid, i.e., by means of the grid switch).

Less complex power stations do not have any switches between the generator and the transformer. Instead, the grid switch is responsible for all functions. Smaller generators and supervoltage generators (Powerformer) are connected to the grid by means of a switch without any transformer.

If there are strong malfunctions in the grid, the generator is separated from the grid. This is achieved by opening the generator switch directly behind the generator binding posts or by opening the grid switch. If a sensor registers a fault in the grid, which typically manifests itself in a drop in voltage or a corresponding change in the current, such a power switch opens one or several of the three phases and thus prevents strong overcurrents. An example of such a malfunction is a short circuit in the line. Due to inertia of the output regulator of the turbine, the turbine generator unit that now is separated from the grid accelerates the number of revolutions in a first phase. This increases the generator frequency and the result is an increasing phase angle error as well as increasing slip between generator voltage and grid voltage.

The generator is automatically reconnected. Typically there is a period of 100 to 200 ms, 300 ms max. (a so-called "Critical Clearing Time") during which the phase angle error and slip can still be tolerated. The dynamic compensation processes during the reconnect are barely acceptable and stability is barely ensured.

Typically, mechanical switches are used as power switches for this purpose. The dimensioning mainly is determined by the maximum disconnect performance that can be up to several 1000 MVA. The switch uses the periodic current crossovers for shutting down. Nonetheless so-called electric arcs occur when the contacts are disconnected. In order to be able to reduce these discharges in a controlled manner, the actual mechanical contacts usually are arranged in a switch box that is filled with an insulating gas such as SF6. ABB-Review 3/2002 (pp. 34-40; ABB, Baden, Switzerland) describes an example of such a design. This type of power switch can also be used to restore power by connecting live contacts.

EP 0984552 discloses the use of compensating resistance loads to expand the reconnection limits after grid malfunctions are removed. When the generator is disconnected from the grid, a resistance load that is equivalent to the preceding grid load is connected to the generator in order to minimize the development of a phase angle error as described. In particular, an adjustable resistance, for example in the form of a plurality of partial resistances that can be connected independent from each other, is proposed for the resistance load. The individual resistances are connected via thyristors that are arranged in an anti-parallel manner.

SUMMARY OF THE INVENTION

One aspect of the present invention is therefore includes providing a quick device for disconnecting and/or connecting phases of a source from phases of a load. In other words, an aspect of the present invention includes a new device for connecting and disconnecting m phases of an alternating current source (e.g., alternating current generator with a top transformer, if any) from n phases of an alternating current load (e.g., alternating current system with superposed transformer, if any). In particular such a device is to be suitable to quickly and automatically reconnect a source, such as a generator, to the grid once the malfunction is removed and to maintain the stability of the grid.

Another aspect of the present invention includes a device in which each of the m phases of the source independently is connected by at least a power switch to each of the n phases of a load in a m×n matrix and first measuring devices for monitoring the m phases of the source as well as second measuring devices for monitoring the n phases of the load are provided, and a switching unit is provided that controls the switching state of the at least one power switch depending on the state of the m phases of the source and of the n phases of the load. The monitored variable preferably is the voltage. Furthermore, the preferred switching unit ensures that the voltage of the m phases of the source connected to the load is symmetrically distributed among them.

Yet another aspect of the present invention includes a switch with which it is possible to connect without having to wait for a full phase cycle (in extreme cases up to 360°). The proposed device, i.e., the respective connection arrangement, makes it possible, for example, to connect even with a phase angle error around 120° or 240°. In this case, generator phase u is connected to grid phase n2 or grid phase n3, respectively, and the other phases continue to wander analogously (i.e., generator phase v is connected to grid phase n3 or n1, respectively, and generator phase w is connected to grid phase n1 or n2, respectively). This results in the same phase angle error conditions as for 0°. If, for example, the generator as the source accelerates the number of revolutions as load when suddenly disconnected from the grid, it is not necessary to wait for 360°=0° to reappear before connecting. Instead, it is possible to connect sooner.

This results in a considerably higher degree of stability for the operating mode. The resulting additional opportunities allow for a larger time window for reconnecting. It has been shown that the resulting, slightly higher measure of slip can be tolerated. The proposed connection arrangement can be used under conditions such as the ones that exist with a generator as source with output starting at 1 MW, even with output in the area above 50 MW and even up to above 2000 MW.

According to a first preferred embodiment of the device, the source is a generator and the load is a grid. The switching device can be arranged as a generator switch between the generator and a transformer (grid transformer) but it can also be arranged as a transformer switch between the grid and the grid transformer. This means a transformer can be arranged between the proposed device and the generator and in this case the source is a generator with a topped transformer. Alternatively, it is possible to arrange a transformer between the proposed device and the load. In this case the load is a grid with a superposed transformer.

As already explained the device can directly connect the generator to the grid with certain types of generators.

The generator can have a stator winding in delta connection or in star connection. If the winding is designed for delta connection, the stator windings of the individual phases are connected on both ends by means of switch groups with n power switches to the n phases of the grid. Thus there are twice as many switch groups as stator windings. Accordingly, it is possible to even connect in 60° steps.

If the generator has a stator winding in star connection, each of the m stator windings by means of a power switch is connected on both sides to the neutral (star) point and by means of a power switch to the phases of the grid. A switch group with n power switches is arranged between the joined power switches to the phases of the grid of each stator winding and the phases of the grid with the switch group allowing individual connections to the individual phases of the grid. In star connection, too, this allows for connections in 60° steps.

The power switches can be conventional, mechanical power switches. Preferably at least one of them, and more preferably all power switches are electronic power switches. Each switch advantageously represents an anti-parallel thyristor arrangement and in particular such an arrangement is integrated into a disk housing, such as those ABB Semiconductors offers for sale under the name "Bi-directional Control Thyristor".

It also is possible to use power switches in which at least two opposing IGBT (Insulated Gate Bipolar Transistor) elements connected in series and/or GTO thyristor elements (Gate Turn-Off Thyristor) are arranged, in particular in the form of SiC-GTO elements with respective anti-parallel diodes. Such elements allow for an interruption of the transient value of the current, for example when the two-fold nominal current of the generator is exceeded. This can provide advantages for the generator (electrodynamic forces and moments) and for the grid (limiting the fault level).

The proposed connection can also be fully or partially integrated into the generator (generator switch), for example. This would also allow the integration of at least a part of the power switches or even the entire connection in the machine housing of the generator and to cool them with independent cooling agents, especially in the form of an independent cooling cycle. It also is possible to arrange the power switches in the machine housing and to integrate them in the cooling system of stator and rotor.

It also is possible to integrate the proposed connection into the transformer. In this case it might be advantageous to generate the 60° step synchronization by way of open transformer windings. In this case a conventional generator can be used. If integrated into the transformer, the connection can be on the grid side or the generator side. Here, too, the integration into the cooling of the transformer can be advantageous; however, it might also be advantageous to provide separate cooling for the connection in the form of a cooling cycle.

Typically a generator has 3 phases; however, it is possible to connect a larger number of generator phases. The synchronization possibilities increase proportionally. Especially suitable for large phase numbers is a generator polygonal winding embodiment. This design can be realized for a 2 layer bar winding based on delta connection and equally distributed connections to the bar connections.

According to another preferred embodiment the device additionally has overvoltage protection. Overvoltage protection can be a diode bridge, for example, that reroutes overvoltage energy to a damping capacity. This can be realized by connecting each of the generator phases as well as each of the grid phases to an R/C load (R for resistance, C for capacity) by means of a diode bridge.

According to another preferred embodiment, additional means for reducing start fluctuations are provided. These can be in the form of transiently connectable resistors in each of the generator phases. After reconnection following a grid malfunction the resistors are switched in series into the connection to the grid and have dimensions that ensure that mechanical torsional oscillations of the shaft are dampened. After approx. ½-1 sec. these resistors are bridged.

Furthermore the present invention relates to a method for disconnecting and/or connecting m phases of a source from n phases of a load. The method preferably is characterized in that each of the m phases of the source, i.e., for example of the generator, independently is connected by means of at least one power switch with each of the n phases of the load, e.g., a grid, in an m×n matrix and a maximum of n switches is closed or opened (and closed when connected), that first measuring devices for monitoring the m phases of the source as well as second measuring devices for monitoring the n phases of the load are provided, and that a switching unit controls the switching state of the switches depending on the state of the m phases of the source and the n phases of the load. Preferably voltage is monitored.

The state can also be monitored by recording a reference phase on the source-side (e.g., generator-side) and on the load-side (e.g., grid-side). The connectivity grid is provided in the form of a monitoring device (measuring arrangements, switching unit).

Preferably the switching unit symmetrically distributes the n phases of the source connected to the load equally among them (voltage symmetry).

Preferably the method is such that short circuits cannot occur. This is achieved, for example, by providing a lock logic that prevents power switches from generating short circuits between grid phases and/or generator phases that are not part of the selected symmetric systems.

According to a preferred embodiment of a method in accordance with the present invention, connection occurs at the instant when a generator phase (more general: phase of the source) has the same voltage as the nearest grid phase (more general: phase of the load) or if it already is somewhat leading in relation to the nearest grid phase. The m-phase generator system is an integral multiple of the n phases of the grid. This means that a symmetric n-phase generator system is available at all times. As an alternative an n-phase grid system can be an integral multiple of the m phases of the generator.

In a group of n closed power switches (of different switch groups) preferably all n switches are opened simultaneously or in a brief regulated sequence as soon as the grid current exceeds a certain threshold and/or the grid voltage falls below a threshold.

Accordingly, for connecting purposes, a group of n power switches is automatically closed following an opening process, if necessary after a pre-set delay, as soon as the grid voltage exceeds a threshold and the phase angle error conditions are met by a grid and a generator phase.

BRIEF DESCRIPTION OF THE DRAWINGS

The invention is to be explained in more detail below based on exemplary embodiments and Figures. The following is shown schematically:

FIG. 3 a principle connection with a generator with 18-phase winding in which each phase connection is connected individually to the grid phases by means of switches;

DETAILED DESCRIPTION OF EXEMPLARY EMBODIMENTS

Figure 1:
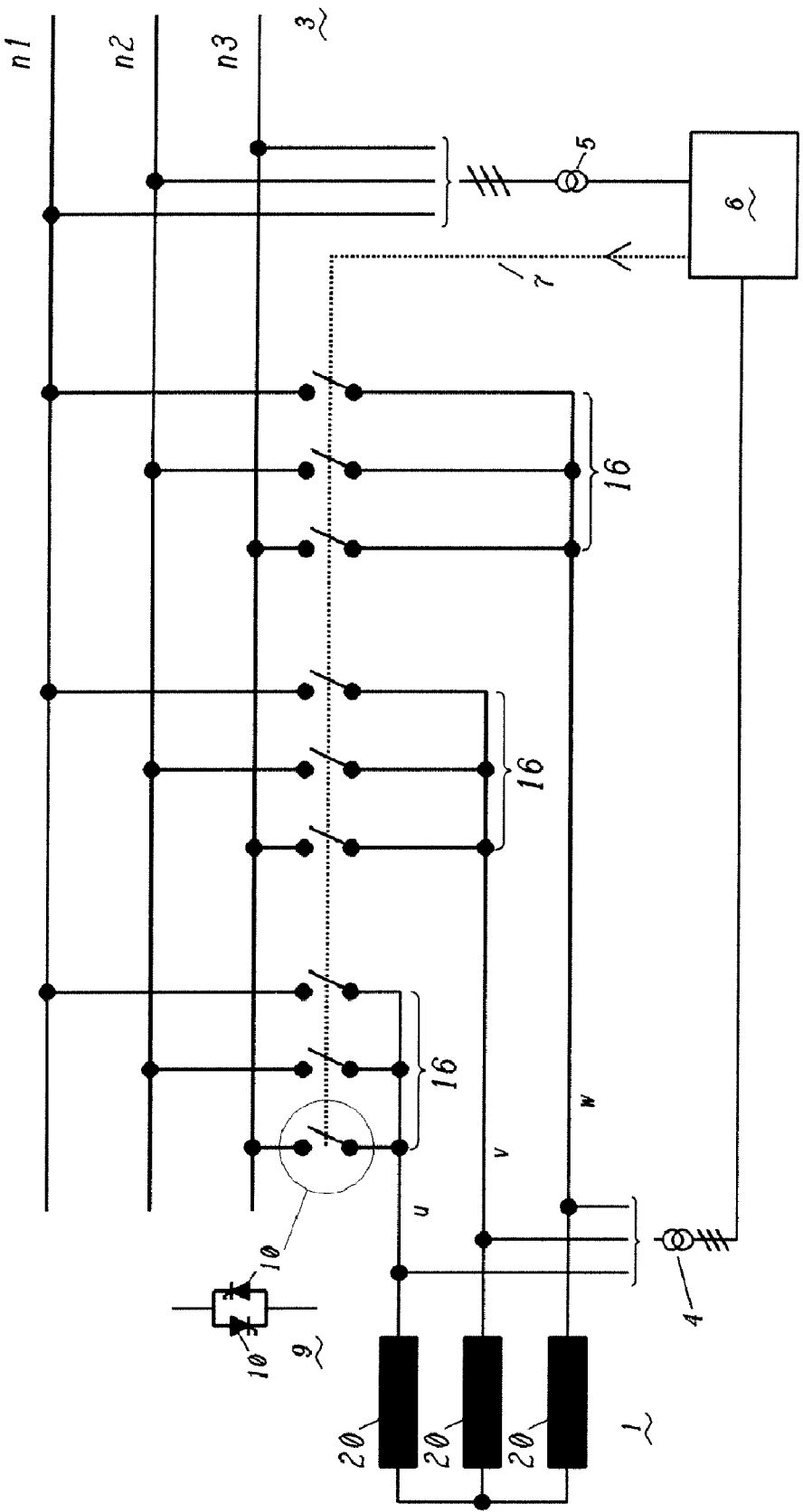
FIG. 1 a principle connection with 9 switches.

FIG. 1 shows a generator switch that basically is a matrix connection. An alternating current source with three stator windings 20 in the form of a generator 1 has three generator phases u, v, and w based on a stator winding in star connection. Each of these generator phases can be connected to three phases n1, n2, as well as n3 of a load, i.e., here grid 3, by means of a switch group 16. Each of these switch groups 16 has three power switches 9 with which the respective generator phase u, v, or w, depending on the situation, can be connected to one of the three grid phases n1, n2, or n3.

As the enlarged diagram shows, the power switch 9 can be thyristors 10 connected in an anti-parallel manner, or for switching large outputs, they can be serial and/or parallel arrangements of thyristors 10 connected in an anti-parallel manner. It also is possible to use "Bi-Directional Control Thyristors" that are mentioned above.

A switching unit 6 records the voltage of generator 1 and grid 3 and by a control line 7 triggers the power switches 9 that provide the best coverage. This is accomplished by monitoring generator phases u, v, and w by corresponding arrangements of measuring transformers 4 and by monitoring grid phases n1, n2, and n3 also by arrangements of measuring transformers 5. The measuring transformers preferably monitor the voltages of the generator phases and the grid phases.

The measuring values read by measuring devices 4, 5 are received and analyzed by the switching unit 6. The switching unit 6 compares the relative voltage ratios of the generator phases and the grid phases and determines which group of switches is the most suitable to carry out the quickest connection of generator 1 to grid 3 in the given situation.

In general it is advantageous from an operating point of view to carry out the connection when the voltage of the generator phase corresponds to the voltage of the nearest grid phase or if it is somewhat leading in relation to the nearest grid phase. A first output impulse then travels in the direction of the grid, as is desired. This means that, depending on the conditions, either connection u-n1; v-n2; w-n3; or connection u-n2; v-n3; w-n1; or connection u-n3; v-n1; w-n2 is carried out. Accordingly, even in extreme cases it is not necessary to wait for the full phase cycle before the grid can be connected again. Rather, at a maximum, a third of the phase cycle is sufficient. This means that a connection is possible even with a classical phase angle error of 120° or 240°. If, for example, the generator accelerates the number of revolutions with abrupt disconnect from the grid, it is not necessary to wait for 360°=0° for reconnecting. Instead, a connection is possible at an earlier point in time. This results in increased stability since earlier connection means that the slip is not yet strong and thus is smaller. Alternatively, it is also possible to release an extended connection period for pre-set, limited slip.

The switch advantageously can be integrated into the generator. It is possible to use a cooling system as described in DE 10310307 A1. In this case the generator will have the customary number of binding posts to the transformer.

Instead of thyristors it is possible to use semiconductor elements, such as GTOs, that can actively be disconnected. They can be actively disconnected, in case of a short circuit disconnect, to protect the shafting. In all other operating cases the GTOs, just like thyristors, are made currentless only in case of crossovers. If necessary, GTOs, in the form of pulse-packet controlled frequency converters, can be used as a motor to start up the generator.

As FIG. 2a shows it also is possible to undo the generator neutral (star) point in order to run the phases on both sides on power switches. This results in a so-called delta connection of generator 1a. With this matrix connection that is expanded by bridge connections and that now provides not only 9 power switches but 18 power switches, it is possible to connect in 60° steps.

Figure 2B:
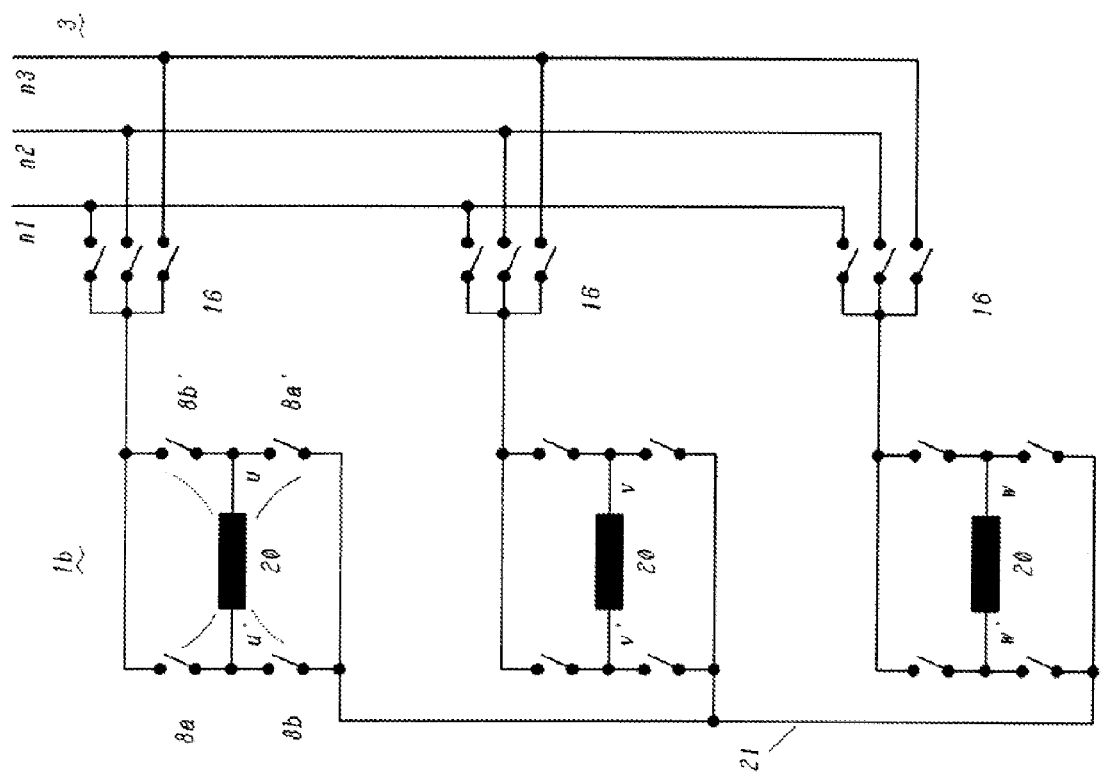
FIG. 2 a) a principle connection with 18 switches by means of which the open three-phase winding of the generator is connected to the grid in delta connection; b) a principle connection with 21 switches and in which the open three-phase winding of the generator is connected to the grid in star connection.

FIG. 2b shows a variation in which the individual generator windings are run on one neutral (star) point 21, i.e., a generator 1b whose stator windings 20 are connected in star connection. Here, too, the device in accordance with the invention can be used. However, this requires 21 power switches. Per generator winding 20, a switch group 16 is provided with three power switches 9 for connecting to grid phases n1, n2, and n3. Furthermore, each generator winding 20 can be connected to the neutral (star) point 21 by means of four power switches 8a, 8a', 8b, 8b', depending on polarity.

The two different connection possibilities are shown schematically in the upper diagram with a solid line (switches 8a and 8a' closed, switches 8b and 8b' open) or a dotted line (switches 8a and 8a' open, switches 8b and 8b' closed).

FIG. 3 schematically shows that the generator 1 can also have a stator winding in polygonal connection with m taps (FIG. 3 specifically shows 18 taps; it also is possible to have 21 taps, for example). The matrix has m×n power switches (in FIG. 3, 60 switches). The material required increases correspondingly. In return, however, longer electric slip operation with minor slip is possible. Voltage periods or a multiple thereof decide repeatedly, in certain time intervals and based on an expanded connection logic, when to disconnect from the grid and connect by a tap that is offset by a few degrees. Instead of a matrix converter a full shaft trigger is used in this case.

Figure 4:
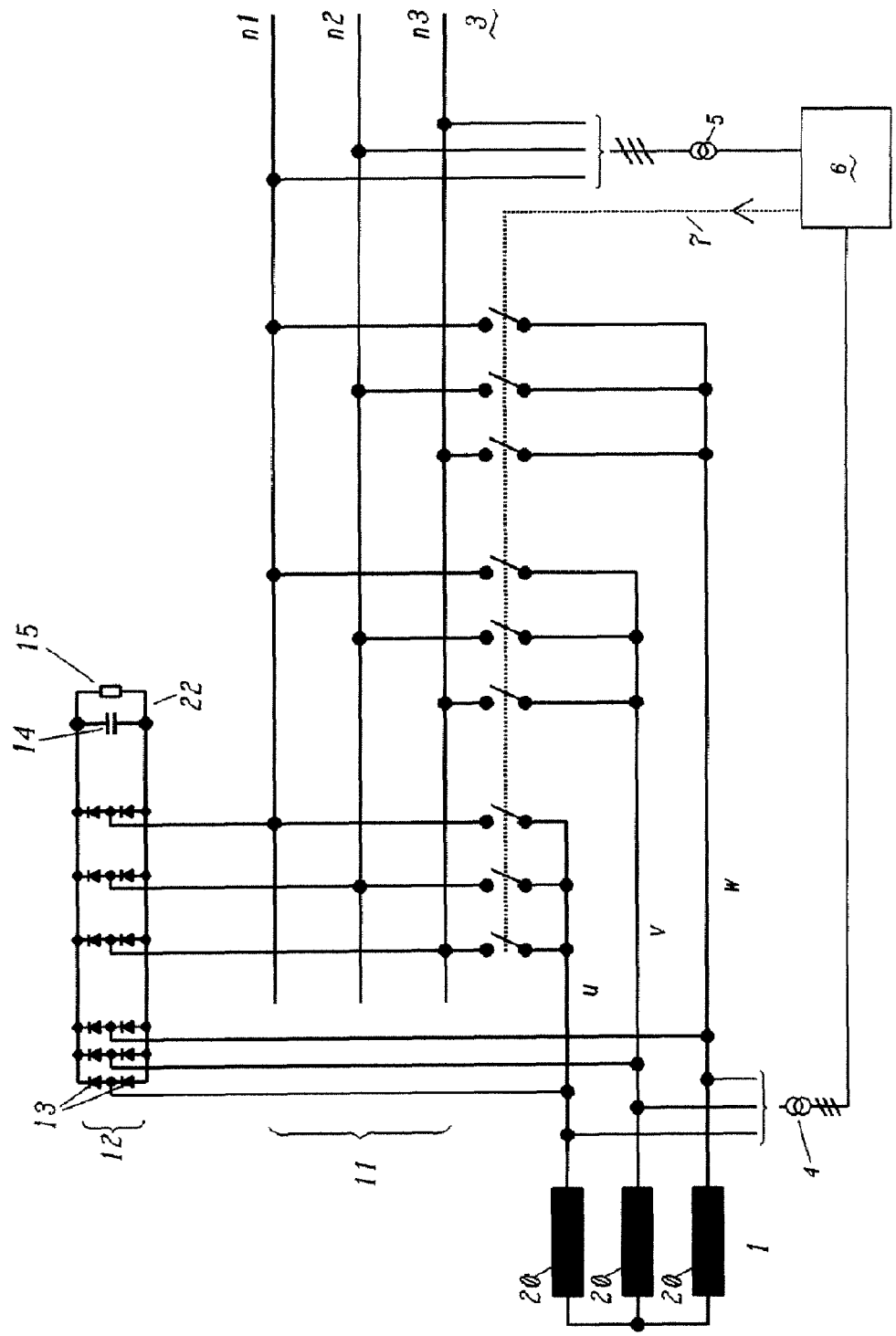
FIG. 4 a principle connection with overvoltage limit.

FIG. 4 shows that it is possible to combine the proposed connection arrangement with an overvoltage protection 12 based on so-called summation wiring. This is accomplished with an additional diode bridge with diodes 13 acting as overvoltage protection and that is connected to the generator phases u, v, and w, as well as to each of the grid phases n1, n2, and n3. At least one damping capacity 14 in the form of a capacitor is connected to the diode bridge, preferably in combination with a resistor 15 arranged in parallel according to a R/C load 22.

During normal operation the capacitor is charged to peak value of the interlinked voltage. The capacity is determined based on the energy that is released when turning off the participating inductivities as well as the permissible overvoltage that occurs on the capacitor when the energy is transferred. The value of resistance of the resistor 15 is determined based on the desired recovery time to bring the capacitor back to normal voltage.

Figure 5:
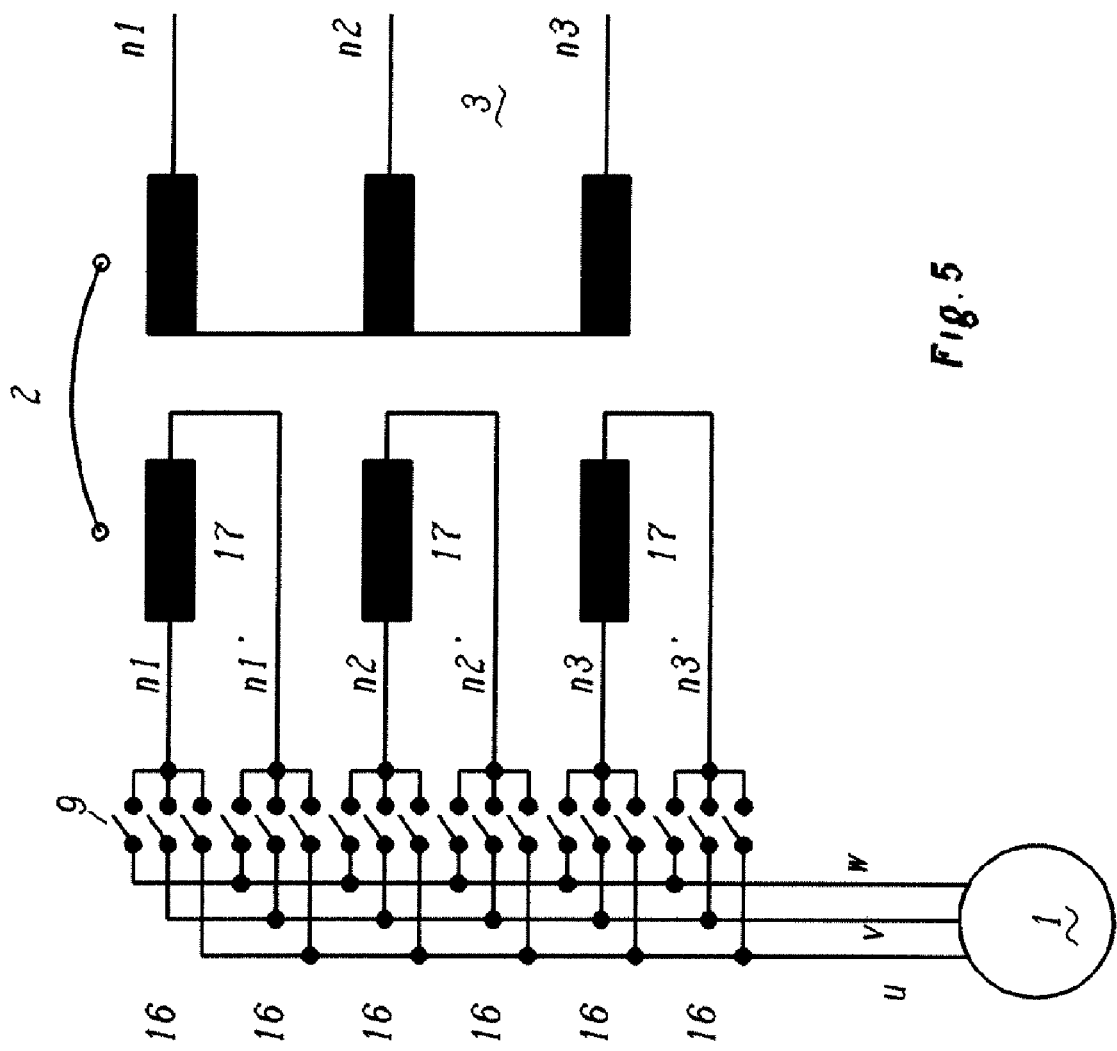
FIG. 5 a principle connection with 18 switches in which the open three-phase winding of a transformer is connected to the generator in delta connection.

FIG. 5 shows how the proposed connection is connected to a transformer 2, in this case a grid transformer, or how it can be integrated into a transformer (analogous to customary step switches). The Figure shows the connection arrangement on the generator side of transformer 2. Of course it also is possible to arrange the connection on the grid side. The individual windings 17 of the transformer 2 on the side of the connection arrangement are bridge connections with the windings 17 again being connected on both sides to each of the generator phases u, v, and w by switch groups 16.

Figure 6:
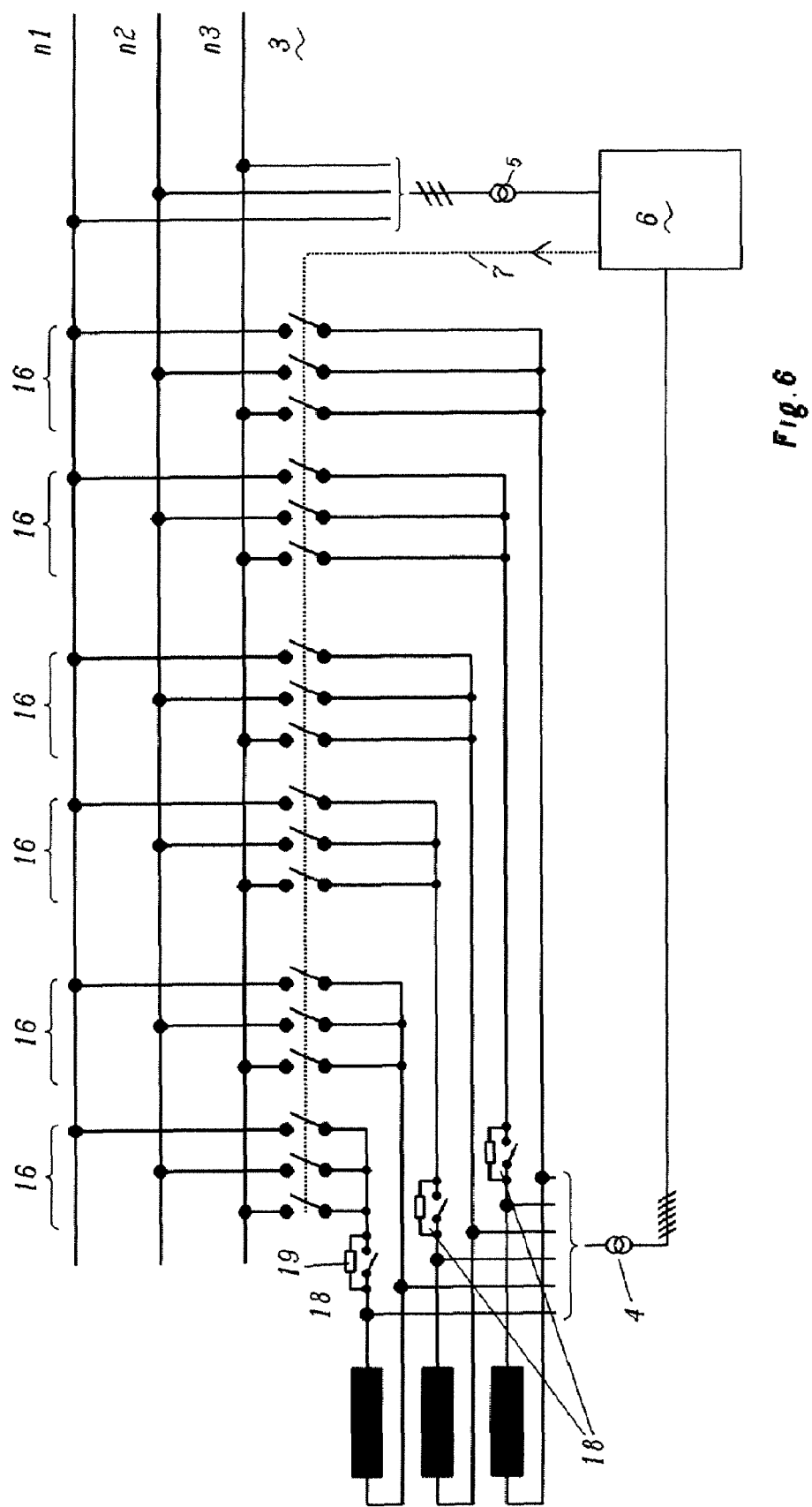
FIG. 6 a principle connection in which the generator is connected in delta connection and in which additional elements for damping are provided and FIG. 7 a principle connection in which the switch group according to the invention is combined with a conventional power switch.

FIG. 6 illustrates how damping elements 18 for damping closing vibrations can be arranged. To this end, resistors 19, which can be connected transiently, are arranged in each generator phase. The required size of the resistors can be determined based on the known dependence of rotor stored-energy constant, generator and grid inductivities based on aperiodic damping. Typical resistance values range around 5% of the nominal impedance of the generator.

Figure 7:
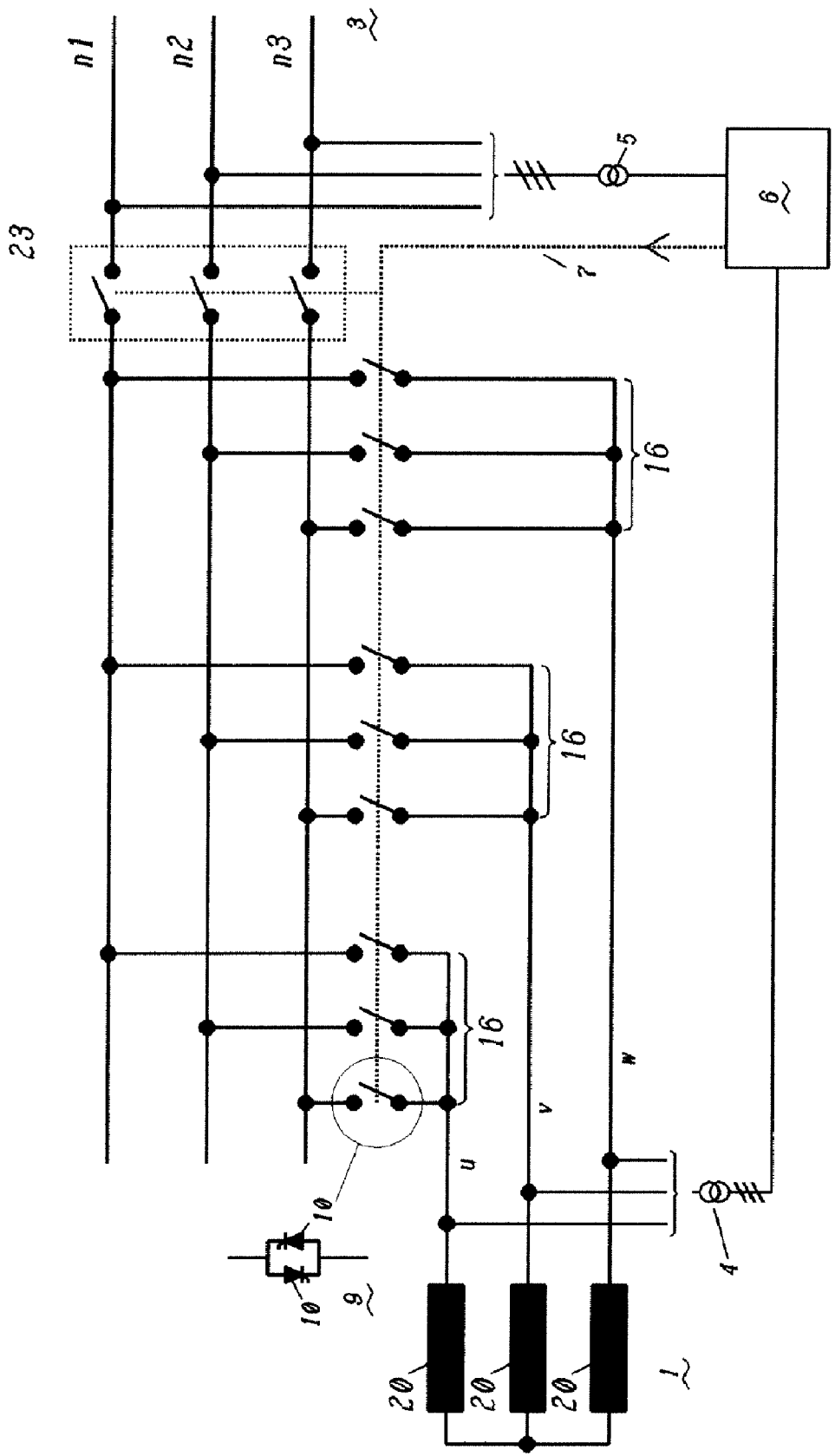

FIG. 7 shows the combined use of the switch group 16 according to the invention with a conventional power switch 23 that can be arranged on the generator side or grid side of the transformer. In this case the power switch 23 can provide short circuit shut-off and reconnection to the grid. In this case switches 9 do not need to switch parasitic currents but only must conduct them. The currentless best selection of the phase position for reconnection is determined with switches 9. This means the switches 9 can be less elaborate.

To ensure proper operation, the programming of the switching unit 6 is such that no short circuits are possible. Accordingly, inert, independent lock logic is provided that prevents switches from generating short circuits between grid phases or generator phases, for example.

LIST OF REFERENCE NUMERALS 1 source, generator
1a generator in delta connection
1b generator in star connection
2 transformer
3 load, grid,
4 measuring device, measuring transformer, generator voltage transformer
5 measuring device, measuring transformer, grid voltage transformer
6 switching unit, switching-on unit
7 control line
8a,8b,8a',8b' power switch for alternative star connection
9 power switch
10 thyristor
11 matrix
12 overvoltage protection
13 diode
14 damping capacity
15 resistor (as in component)
16 switch group
17 winding of 2
18 damping element
19 resistor
20 stator winding of 1
21 neutral (star) point
22 R/C load
23 conventional power switch
u, v, w phases of the source, phases of the generator, generator phases
n1, n2, n3 phases of the load, phases of the grid, grid phases While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A system comprising:
a generator having m phases;
a grid having n phases; and
a device for disconnecting and/or connecting the m phases of the generator from the n phases of the grid, the device comprising
at least one power switch connecting each of the m phases of the generator independently with each of the n phases of the grid in an m x n matrix;
first measuring devices configured and arranged to monitor the m phases of the generator and second measuring devices configured and arranged to monitor the n phases of the grid;
a switching unit configured and arranged to control the switching state of the at least one power switch depending on the state of the m phases of the generator and the n phases of the grid; and
damping elements configured and arranged to reduce start fluctuations, wherein the damping elements comprise transiently connectable resistors in each of the generator's phases and between the generator and the grid.

2. A device according to claim 1, further comprising a transformer arranged between said device and said generator.

3. A device according to claim 2, wherein the at least one power switch is at least partially integrated into the generator; or
wherein the at least one power switch is at least partially integrated into the transformer; or
both.

4. A device according to claim 2,
wherein the transformer comprises a housing and a cooling device; and
wherein at least one of the at least one power switch is arranged in the transformer housing and cooled by the transformer cooling device.

5. A device according to claim 2,
wherein the transformer comprises a housing, and further comprising an independent cooling device; and
wherein at least one of the at least one power switch is arranged in the transformer housing and cooled by the independent cooling device.

6. A device according to claim 1, wherein the grid comprises a superposed transformer.

7. A device according to claim 1, further comprising:
switch groups with n power switches; and
wherein the generator comprises stator windings each having two sides and arranged in a delta connection and connected on both sides by the switch groups to the n phases of the grid.

8. A device according to claim 1, further comprising:
power switches;
wherein the generator comprises stator windings, each winding having two sides, arranged in a star connection with a neutral point;
wherein each of the stator windings is connected on both sides by the power switches with the neutral point and by power switches with the phases of the grid;
wherein a switch group comprising n of said power switches is arranged between the power switches and phases of the grid, said switch group permitting individual connections to the individual phases of the load.

9. A device according to claim 1, wherein at least one of said at least one power switch comprises an electronic power switch.

10. A device according to claim 9, wherein the at least one power switch comprises at least two thyristors arranged in anti-parallel.

11. A device according to claim 9, wherein at least one of the at least one power switch comprises SiC-based thyristors.

12. A device according to claim 9, wherein at least one of the at least one power switch comprises at least two opposing IGBT elements connected in series, GTO elements, or both.

13. A device according to claim 12, wherein the GTO elements comprise SiC-GTO elements with respective diodes connected in anti-parallel.

14. A device according to claim 1,
wherein the generator comprises a generator with an output in excess of 1 MW, optionally with an output above 50 MW, optionally with an output above 2000 MW.

15. A device according to claim 1, wherein the generator has 3, 6, 9, 12, 15, 18, 21, or 24 phases, and wherein the grid has 3 or 6 phases.

16. A device according to claim 1,
wherein the generator comprises a housing and a cooling agent; and
wherein at least one of the at least one power switch is arranged in the generator housing and cooled by the generator cooling agent.

17. A method for changing a connection state between an alternating voltage current-providing generator and a grid having a load, between an unconnected state and a connected state, by connecting and/or disconnecting m phases of the generator from n phases of the grid, the method comprising:
providing a device according to claim 1;
independently connecting each of the m phases of the generator by at least one power switch with each of the n phases of the grid in an m x n matrix;
opening or closing a maximum of n power switches with said switching unit;
monitoring the m phases of the generator with the first measuring devices and monitoring the n phases of the grid with the second measuring devices, wherein said monitoring with the first measuring devices, said monitoring with the second measuring devices, or both, comprises recording a reference phase;
providing a connectivity grid comprising at least one of said first and second measuring devices, or the switching unit; and
connecting the generator to the grid when the phase of the generator has the same voltage as the nearest phase of the grid, or if the phase of the generator leads the nearest phase of the grid.

18. A method according to claim 17, further comprising:
providing a lock logic in the switching unit to prevent the at least one power switch from generating short circuits between load phases, between generator phases, or between both.

19. A method according to claim 17, further comprising:
symmetrically distributing the m phases of the source connected to load with the switching unit.

20. A method according to claim 17, further comprising:
simultaneously, or in a regulated, brief sequence, closing all open power switches in a group of the at least one power switch when the current on a load side exceeds a threshold, when the voltage on a load side falls below a threshold, or both.

21. A method according to claim 17, further comprising:
closing a group of n power switches automatically, optionally following a pre-set delay, after being opened when the voltage on a grid side again exceeds a threshold.

22. A device according to claim 1, further comprising:
an independent cooling device;
wherein the generator comprises a housing; and
wherein at least one of the at least one power switch is arranged in the generator housing and cooled by the independent cooling device.

23. A device according to claim 22, wherein the independent cooling device comprises an independent cooling cycle.

24. A system comprising:
a generator having m phases;
a grid having n phases; and
a device for disconnecting and/or connecting the m phases of the generator from the n phases of the grid, the device comprising
at least one power switch configured and arranged to connect each of the m phases of the generator independently with each of the n phases of the grid in an m x n matrix;
first measuring devices configured and arranged to monitor the m phases of the generator and second measuring devices configured and arranged to monitor the n phases of the grid;
a switching unit configured and arranged to control the switching state of the at least one power switch depending on the state of the m phases of the generator and the n phases of the grid; and
damping elements configured and arranged to reduce start fluctuations, wherein the damping elements comprise transiently connectable resistors in each of the generator's phases and between the generator and the grid;
an R/C load;
an overvoltage protection system including a diode bridge and a damping capacity, the diode bridge configured and arranged to divert overvoltage energies to the damping capacity, the diode bridge also configured and arranged to connect each of the generator phases and each of the grid phases to the R/C load.

* * * * *